US008842997B2

(12) United States Patent
Liu et al.

(10) Patent No.: US 8,842,997 B2
(45) Date of Patent: Sep. 23, 2014

(54) APPARATUS AND METHOD FOR GENERATING INTERLEAVED RETURN-TO-ZERO (IRZ) POLARIZATION-DIVISION MULTIPLEXED (PDM) SIGNALS

(75) Inventors: Xiang Liu, Marlboro, NJ (US); Chandrasekhar Sethumadhavan, Old Bridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 374 days.

(21) Appl. No.: 12/985,835

(22) Filed: Jan. 6, 2011

(65) Prior Publication Data

US 2012/0177372 A1     Jul. 12, 2012

(51) Int. Cl.
*H04B 10/04* (2006.01)
*H04B 10/12* (2006.01)
*H04B 10/50* (2013.01)
*H04B 10/508* (2013.01)
*H04B 10/556* (2013.01)
*H04B 10/532* (2013.01)

(52) U.S. Cl.
CPC .......... *H04B 10/532* (2013.01); *H04B 10/5053* (2013.01); *H04B 10/5055* (2013.01); *H04B 10/508* (2013.01); *H04B 10/5561* (2013.01)
USPC .......... 398/184; 398/182; 398/183; 398/185; 398/186; 398/187; 398/188; 398/189; 398/201

(58) Field of Classification Search
None
See application file for complete search history.

(56) References Cited

U.S. PATENT DOCUMENTS 5,596,436 A * 1/1997 Sargis et al. .................... 398/76

2002/0110302 A1 * 8/2002 Gopalakrishnan ................ 385/2
2007/0009269 A1 * 1/2007 Zitelli ........................... 398/188
2010/0067914 A1   3/2010 Tanaka et al.

(Continued)

FOREIGN PATENT DOCUMENTS

JP           2010068235 A      3/2010
JP           2010081287 A      8/2010
WO   PCT/US2012/020270      4/2012

OTHER PUBLICATIONS

Renaudier J et al; "Impact Of Temporal Interleaving Of Polarization Tributaries Onto 100/Gb/s Coherent Transmission Systems with RZ Pulse Carving" IEEE Photonics Technology Letters, IEEE vol. 18 No. 24, Dec. 15, 2008.
Killey, Mitigation of Transmission Impairments Long-Haul Submarine Links Using DSP-Based Electronic Predistortion, IEEE 2008, pp. 243-244.

(Continued)

*Primary Examiner* — Darren E Wolf
(74) *Attorney, Agent, or Firm* — A. Ralston

(57) ABSTRACT

Return To Zero (RZ) shaping is performed for a first I/Q modulator whose output corresponds to a first polarization component using a first two digital-to-analog convertors (DACs), each of which is sampled at approximately twice a modulation symbol rate or more and has an output with a first interleaving order that interleaves one of a first pair of intended drive signal patterns and zeros. RZ shaping is also performed for a second I/Q modulator whose output corresponds to a second polarization component using a second two DACs, each sampled at approximately twice the modulation symbol rate or more and having a second interleaving order that interleaves zeros and one of a second pair of intended drive signal patterns, the second interleaving order opposite the first interleaving order. The first polarization and the second polarization may be combined, thereby forming an Interleaved Return To Zero (IRZ) Polarization Division Multiplexed (PDM) signal.

20 Claims, 2 Drawing Sheets

(56) References Cited

U.S. PATENT DOCUMENTS

| | | | |
|---|---|---|---|
| 2010/0080562 A1* | 4/2010 | Perkins et al. | 398/98 |
| 2010/0080571 A1 | 4/2010 | Akiyama et al. | |
| 2010/0260504 A1 | 10/2010 | Takahara | |
| 2011/0222850 A1* | 9/2011 | Roberts et al. | 398/38 |

OTHER PUBLICATIONS

Borne et al, 1.6-b/s/Hz Spectrally Efficient Transmission Over 1700 km of SSMF Using 40 x 85.6-Gb/s POLMUX-RZ-DQPSK, Journal of Lightwave Technology, vol. 25, No. 1, Jan. 2007, pp. 222-232.

* cited by examiner

APPARATUS AND METHOD FOR GENERATING INTERLEAVED RETURN-TO-ZERO (IRZ) POLARIZATION-DIVISION MULTIPLEXED (PDM) SIGNALS

FIELD OF THE INVENTION

The invention relates to optical transmission systems, and, in particular, to systems, apparatuses and techniques for generating interleaved return-to-zero (IRZ) polarization-division multiplexed (PDM) signals.

BACKGROUND INFORMATION

To meet the ever-increasing demand on communication capacity, optical transmission systems are moving towards high channel data rate (e.g., 100's-Gb/s/channel or Terabit/s/channel) and high spectral efficiency (SE). Digital coherent detection is powerful technique capable of fully recovering the complex field of a received signal, allowing the reception of high SE signals and the compensation of linear impairments including chromatic dispersion (CD) and polarization-mode dispersion (PMD) using digital filters. However, fiber nonlinearities impose a severe limitation on the transmission performance of coherent signals, especially high SE signals with large constellation size. It is desired to improve the signal tolerance to fiber nonlinear effects. Interleaved return-to-zero (IRZ) polarization-division multiplexing is a promising modulation technique to support high data-rate transmission with high signal tolerance to fiber nonlinear effects.

As is well known, an optical signal may have two orthogonal polarization states, each of which may have different properties. Sometimes such polarization states are intentionally introduced, such as in creating a polarization-multiplexed signal in which the two orthogonal polarization states of the optical carrier are arranged so that each carries different data in order to double the spectral efficiency. Such a polarization-multiplexed signal has two so-called "generic" polarization components, each of which carries a single data modulation. Note that by a generic polarization component it is generally intended the signal at the point at which the modulation of that polarization component is completed. It should be appreciated that each generic polarization component may initially, or otherwise, exist separate from the other generic polarization component with which it is later combined. It should also be appreciated that the phase of the generic need not be constant.

There are two conventional methods for generating IRZ-PDM signals. A first conventional method of implementing generation of an IRZ-PDM signal is shown in FIG. 1. In particular, FIG. 1 illustrates a first conventional implementation for generating IRZ-PDM signals that are modulated using quadrature phase-shift keying (QPSK). As shown, the example transmitter 100 arranges one pulse carver 102, one polarization-beam splitter (PBS) 104, one polarization-beam combiner (PBC) 106, and two I/Q modulators 108, 109. In addition, there is a fixed optical delay 110 between the two modulator paths to produce the example IRZ-PDM-QPSK signal. Other modulation formats such as quadrature amplitude modulation (QAM), binary phase-shift keying (BPSK) etc. may be utilized by the transmitter for the modulation scheme of the transmitted signal.

In further detail, output signal from a laser source 112 is provided as input to pulse carver 102 for production of corresponding return to zero (RZ) signal. The pulse carver also receives as input a clock C1. The clock signal has a frequency of 1/Ts where Ts is the modulation symbol period. For instance, the clock may be a 28-GHz clock such that the pulse carver produces a RZ pulse train at a repetition rate of 28 GHz.

The RZ signal from the pulse carver 102 is directed to PBS 104. The PBS splits the incident beam into two beams of differing linear polarization, with each of the beams provided to a respective I/Q modulator 108, 109. A first I/Q modulator 108 handles modulation of the in-phase (I1) and quadrature (Q1) components of a first signal intended to be transmitted (e.g., an x-polarization). A second I/Q modulator 109 handles modulation of the in-phase (I2) and quadrature (Q2) components of a second signal intended to be transmitted (e.g., a y-polarization). There is a fixed delay 100 between the two I/Q modulator paths that is equal a half symbol period, Ts/2. As illustrated in FIG. 1, for example, each of the polarizations may be a 56-Gb/s RZ-QPSK signal after modulation.

After delay of one of the polarizations (e.g., the second polarization, the y-polarization), the first and second polarization are combined by the PBC 106 to produce the resultant modulated IRZ-PDM signal. For example, as illustrated in FIG. 1, the resultant modulated signal may be a 112 Gb/s IRZ-PDM-QPSK signal.

A second conventional method of implementing generation of an IRZ-PDM signal is shown in FIG. 2. In particular, FIG. 2 illustrates a second conventional implementation of the generation IRZ-PDM signals that are modulated using QPSK. Other modulation formats such as QAM and BPSK etc. may be utilized by the transmitter for the modulation scheme of the signal to be transmitted. As shown, the example transmitter 200 arranges two pulse carvers 202, 204, one polarization-beam splitter (PBS) 206, one polarization-beam combiner (PBC) 210, and two I/Q modulators 208, 209. In addition, a necessary delay of one half a symbol period (i.e., ½Ts-delay) between the two modulator paths is realized by delaying the drive signals of the pulse carver and I/Q modulator of one modulator path with respect to the pulse carver and I/Q modulator of the other respective modulator path.

In further detail, an output signal from a laser source 212 is directed to PBS 206. The PBS splits the incident beam into two beams of differing linear polarization, with each of the beams provided as input to a respective pulse carver 202, 204 for production of a corresponding return to zero (RZ) signal. A first pulse carver (e.g., pulse carver 202) receives a first beam from the PBS and also receives as input a first clock C1. First clock signal C1 has a frequency of 1/Ts where Ts is the modulation symbol period. A second pulse carver (e.g., pulse carver 204) receives a second beam from the PBS and also receives as input a second clock C2. Second clock signal C2 has a frequency of 1/Ts where Ts is the modulation symbol period but is delayed by a half symbol period (i.e., ½Ts) with respect to clock signal C1. For instance, both clock signals may be a 28-GHz clock such that corresponding pulse carvers produce a 28-GHz RZ output signal for each path, one output signal delayed with respect to the other output signal.

The RZ signal from each pulse carver is provided to a corresponding I/Q modulator 208, 209. The first I/Q modulator 208 handles modulation of the in-phase (I1) and quadrature (Q1) components of a first signal intended to be transmitted (e.g., an x-polarization). The second I/Q modulator 209 handles modulation the in-phase (I2) and quadrature (Q2) components of a second signal intended to be transmitted (e.g., a y-polarization). The I2/Q2 components are also delayed by a half symbol period (i.e., ½Ts) with respect to the I1/Q1 components. Thus, drive signals of the second pulse carver 204 and the second I/Q modulator 209 are delayed (e.g., by a fixed delay, by an adjustable delay) with respect to those of the first pulse carver 202 and first I/Q modulator 208. For example, as illustrated in FIG. 2, the output of a respective I/Q modulator 208, 209 may be a 56-Gb/s RZ-QPSK signal for a respective polarization.

The first and second polarizations (e.g., the x-polarization and the y-polarization) output from the respective I/Q modulators are combined by PBC 210 to produce the result modulated IRZ-PDM signal. For example, as illustrated in FIG. 2, the resultant signal may be a 112 Gb/s IRZ-PDM-QPSK signal.

SUMMARY OF THE INFORMATION

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter nor to delineate the scope of the disclosed subject matter. Its sole purpose is to present some concepts in a simplified form as a prelude to the more detailed description that is discussed later.

The limitations of current optical system elements present several obstacles for the development of future high channel data rate and high spectral efficiency (SE) optical transmission systems. For example, various key components useful for the creation of high communication capacity optical transmission systems are costly to manufacture, costly to operate and/or difficult to arrange/operate. For example, with the conventional implementations above, at least one pulse carver is needed, which undesirably adds cost, loss, size and power usage. Conventional apparatus and method implementations for generating interleaved return-to-zero (IRZ) polarization-division multiplexed (PDM) signals suffer from a variety of these and other drawbacks.

The first conventional implementation shown in FIG. 1 has at least several drawbacks. First, use of an optical pulse carver 102 for RZ pulse shaping leads to increases in loss, cost, size, and power of such an implementation. Second, the fixed delay 110 between the two I/Q modulator paths is a half symbol period, Ts/2. For example, for a 112-Gb/s IRZ-PDM-QPSK, the half symbol period would be 17.8 ps. Such a small time period of delay between modulator paths makes it difficult to integrate the two I/Q modulators 108, 109. Further, the fixed delay 110 between the two RZ-QPSK signals being fixed prevents the transmitter 100 from adaptively changing the data rate, which is undesirable for transmitter applications where data rates need to be or are desirably changed (e.g., to accommodate different FEC overheads). Third, the utilization of a PBS 110 between the pulse carver 102 and the two I/Q modulators 108, 109 increases the difficult of integrating the pulse carver and the I/Q modulators. Similarly, the second conventional implementation shown in FIG. 2 suffers from one or more drawbacks. Notably, two pulse carvers 202, 204 are required, further increasing loss, cost, size, and power in such an implementation as compared to that of FIG. 1. In addition, such an implementation may have an undesirable (i.e., high) transmitter loss.

Accordingly, method and apparatus is provided for generating interleaved return-to-zero (IRZ) polarization-division multiplexed (PDM) signals with reduced optical complexity and loss as compared to conventional implementations.

In one embodiment, a method includes performing RZ shaping for a first modulator whose output corresponds to a first polarization component using a first two DACs, each sampled at approximately twice a modulation symbol rate or more and having an output with a first interleaving order that interleaves one of a first pair of intended drive signal patterns and zeros. RZ shaping is also performed for a second modulator whose output corresponds to a second polarization component using a second two DACs, each sampled at approximately twice the modulation symbol rate or more and having an output with a second interleaving order that interleaves zeros and one of a second pair of intended drive signal patterns, the second interleaving order being opposite to the first interleaving order.

In one embodiment, the first polarization and the second polarization components are combined, thereby forming an Interleaved Return To Zero (IRZ) Polarization Division Multiplexed (PDM) signal.

In one embodiment, each of the first pair of intended drive patterns has a value of one for a one-bit and a value of negative one for a zero-bit. In another embodiment, each of the first pair of intended drive patterns has more than two values.

The method may include amplifying the output of at least one the DACs prior to driving the first modulator. The first modulator may perform quadrature phase shift keying (QPSK) modulation, quadrature amplitude modulation (QAM), and binary phase-shift keying (BPSK) modulation. Likewise, the second modulator may perform QPSK, QAM, or BPSK. The modulation format of one or both modulators may be reconfigurable. Further, one or both modulators may be biased at null. In one embodiment, the modulation symbol rate is approximately 28 GHz.

One embodiment further includes splitting a beam from a light source into a first beam and a second beam and providing the first beam to the first modulator and providing the second beam to the second modulator.

In one embodiment, an apparatus includes a first two DACs, each of the first two DACs configured to be sampled at approximately twice a modulation symbol rate or more and have an output with a first interleaving order that interleaves one of a first pair of intended drive signal patterns and zeros, and a first modulator for generating a first polarization based on the output of the first two DACs. This embodiment also includes a second two DACs, each of the second two DACs configured to be sampled at approximately twice a modulation symbol rate or more and have an output with a second interleaving order that interleaves zeros and one of a second pair of intended drive signal patterns, wherein the second interleaving order is opposite the first interleaving order, and a second modulator for generating a second polarization based on the output of the second two DACs.

In one embodiment, one of the first two DACs is configured to interleave a first component drive pattern of the first pair of intended drive signal patterns and zeros, and the other of the first two DACs is configured to interleave a second component drive pattern of the first pair of intended drive signal patterns and zeros.

One embodiment may include a polarization beam combiner for combining the first polarization and the second polarization. One or both modulators may be I/Q modulators. Another embodiment may include polarization beam splitter whose a first output is connected to the first modulator, and whose second output is connected to the second modulator. Yet another embodiment may include a source for providing light to the polarization beam splitter.

In one embodiment, an amplifier interposed between the first modulator or the second modulator and a respective at least one of the DACs. Any one modulator may be configured to perform quadrature phase shift keying (QPSK) modulation, quadrature amplitude modulation (QAM), binary phase-shift keying (BPSK) modulation, and 16-QAM modulation or a combination thereof. That is; the modulation format of one or both modulators may be reconfigurable.

In an embodiment, an apparatus include a first DAC for generating a first output that interleaves in a first order a first intended drive signal pattern and zeros, a second DAC for generating a second output that interleaves in the first order a second intended drive signal pattern and zeros, a first modulator for generating a first polarization based on the first output and the second output, a third DAC for generating a third output that interleaves in a second order opposite the first order zeros and a third intended drive signal pattern, a fourth DAC for generating fourth output that interleaves in the second order zeros and a fourth intended drive signal pattern, and a second modulator for generating a second polarization based on the third output and the fourth output, wherein each DAC is configured to be sampled at approximately twice a modulation symbol rate or more.

BRIEF DESCRIPTION OF THE DRAWINGS

Example embodiments will become more fully understood from the detailed description given herein below and the accompanying drawings, which are given by way of illustration only and thus are not limiting of the present invention, wherein like elements are represented by like reference numerals and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Described herein are methods and apparatuses for efficiently generating an interleaved return-to-zero polarization-division-multiplexed (IRZ-PDM) signal without using any optical pulse carvers. Various ones of the embodiments provided: 1) perform RZ shaping for one I/Q modulator, corresponding to the x- or y-polarization component of a PDM signal, using two digital-to-analog convertors (DACs), each of which is sampled at twice the modulation symbol rate and has an output that interleaves a mapped version of the intended drive signal pattern (e.g., 1 for a 1-bit and −1 for a 0-bit) and zeros; and 2) perform the RZ shaping for a second I/Q modulator by using two DACs, each of which is sampled at twice the modulation symbol rate and has an output that interleaves zeros and a mapped version of the intended drive signal pattern with an interleaving order opposite to that of the first I/Q modulator.

Figure 1:
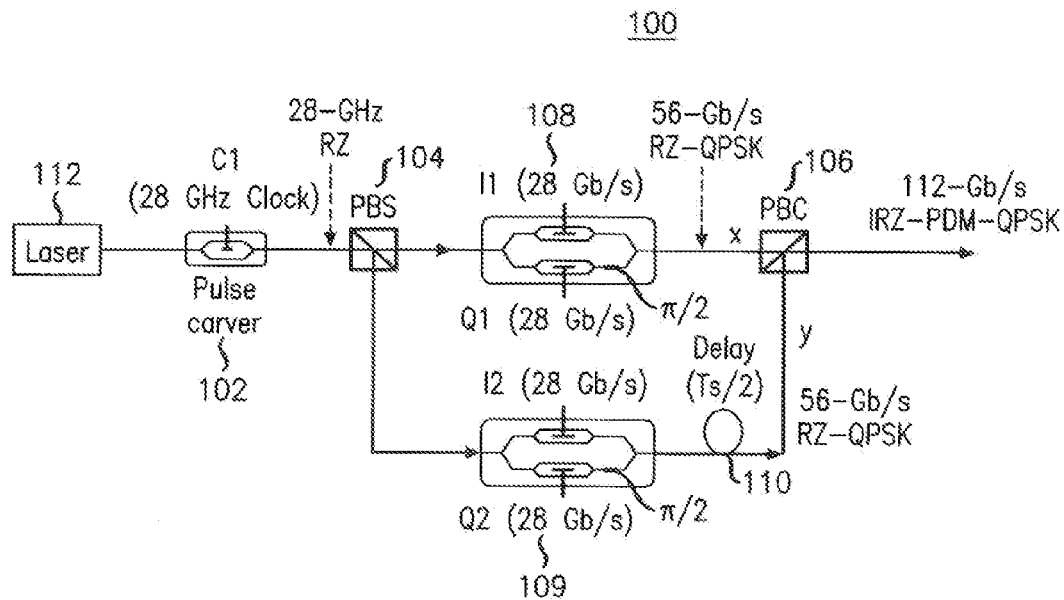
FIG. 1 is a schematic diagram of a first conventional implementation of IRZ-PDM-QPSK transmitter found in the prior art.
Figure 2:
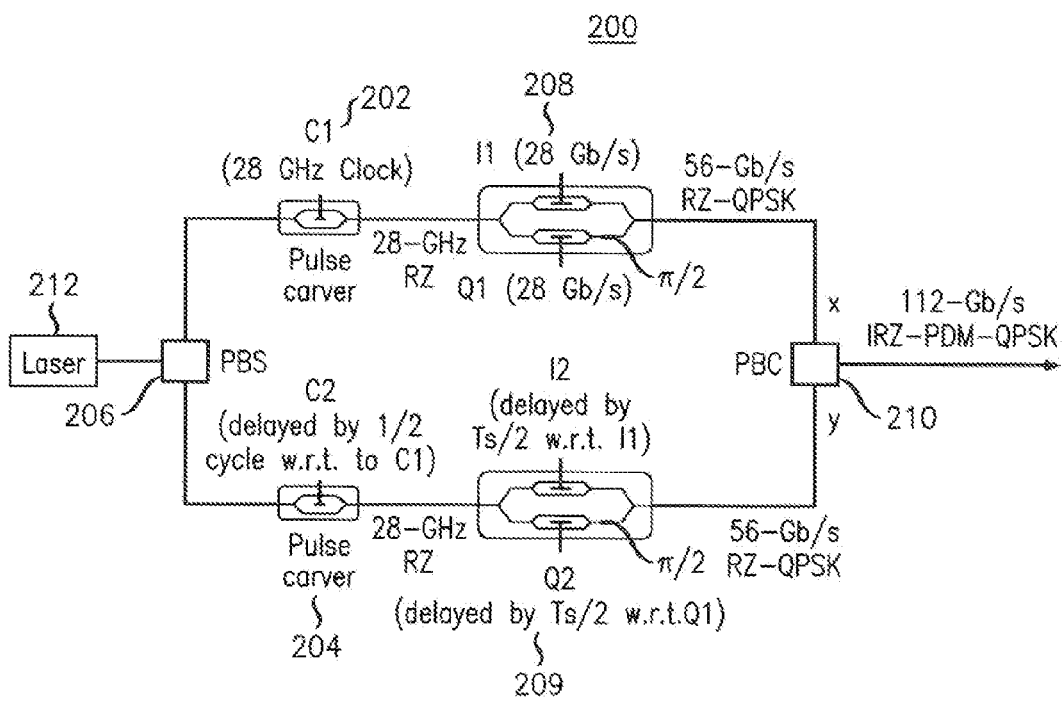
FIG. 2 is a schematic diagram of a second conventional implementation of IRZ-PDM-QPSK transmitter found in the prior art.
Figure 3:
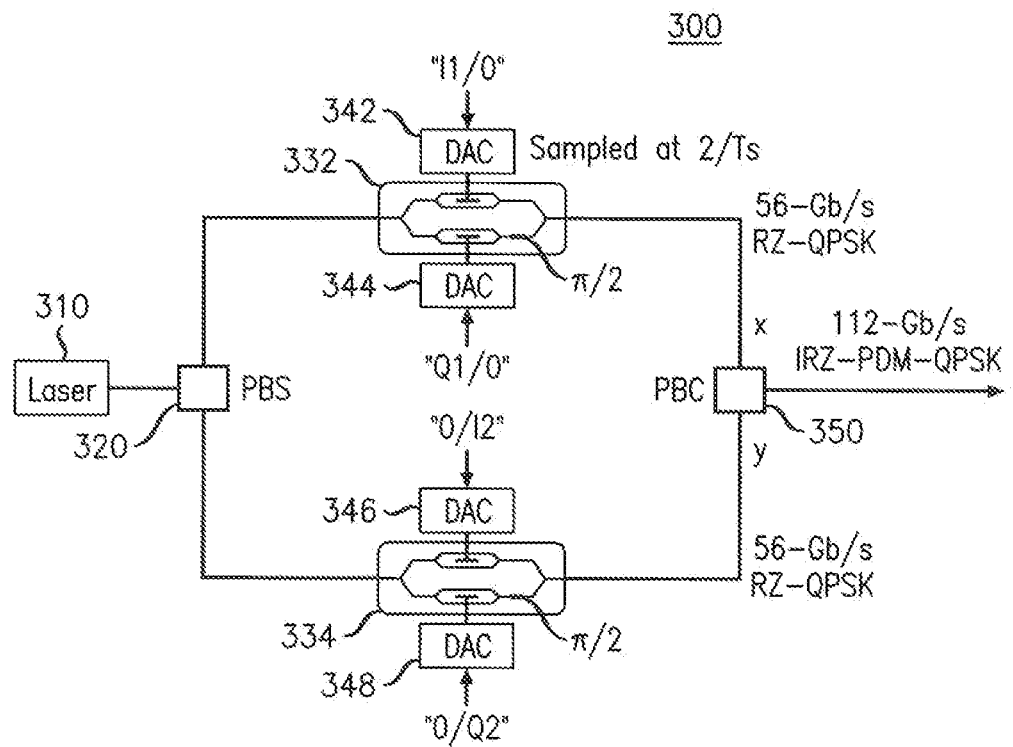
FIG. 3 is a schematic diagram of an example embodiment of an IRZ-PDM-QPSK transmitter according to principles of the invention.

FIG. 3 is a schematic diagram of an example embodiment of an IRZ-PDM-QPSK transmitter according to principles of the invention. Other embodiments of the transmitter may utilize different modulation formats such as QAM and BPSK etc. for the modulation scheme of the transmitted signal. The illustrated transmitter 300 generates an IRZ-PDM-QPSK signal. Laser 310 generates an input optical carrier which is provided to PBS 320. The PBS splits the incident beam into two beams of differing linear polarization, with each of the beams provided as input to a respective modulator 332, 334 for production of a corresponding return to zero (RZ) signal.

Modulators 332, 334 may be I/Q modulators, single sideband modulators, and the like. The illustrated modulators are I/Q modulators. Each branch of the I/Q modulator has modulation signal. One of the modulation branches also includes a phase shifter to control the phase between the branches of the modulated signal. For example, the phase shifter of an I/Q modulator may have a value of $\pi/2$.

In one embodiment, the transmitter 300 receives the linear polarized source beams from the PBS. In other embodiments, the PBS and/or laser may be included in the transmitter.

Four DACs 342, 344, 346, 348 are used to generate respective drive signals (e.g., a respective first, second third and fourth drive signal) for the I/Q modulators 332, 334. The output signal of any one of the four DACs may be amplified by RF amplifiers (not shown) before driving a respective I/Q modulator. For example, in FIG. 3, the output of a first set of two DACs 342, 344 are used to drive a first I/Q modulator 332 and the output of a second set of two DACs 346, 348 are used to drive a second I/Q modulator 334.

Each DAC of the first set of two DACs 342, 344 is sampled at twice the modulation symbol rate and has an output that interleaves a mapped version of a tributary of the intended drive signal pattern and zeros. For example, as illustrated, a first DAC 332 of the first set generates drive signal "I1/0", which is the mapped I1 data tributary interleaved with zeros; a second DAC of the first set 334 generates drive signal "Q1/0", which is the mapped Q1 data tributary interleaved with zeros. That is; the interleaving of one of a first pair of intended drive signal patterns (I1, Q1) and zeros is output by a DAC of the first set of two DACs. In further detail, one of the first two DACs (e.g., first DAC 342) is configured to interleave a first component drive pattern of the first pair of intended drive signal patterns and zeros, and the other of the first two DACs (e.g., second DAC 344) is configured to interleave a second component drive pattern of the first pair of intended drive signal patterns and zeros.

Each DAC of the second set of two DACs 346, 348 is sampled at twice the modulation symbol rate and has an output that interleaves zeros and a mapped version of a tributary of the intended drive signal pattern. The interleaving order of mapped data tributary and zeros for the second set of DAC is opposite that of the first set of DAC. For example, as illustrated, DAC 346 (i.e., a third DAC) of the second set of DACs generates drive signal "0/I2", which is zeros interleaved with the mapped I2 data tributary. The other DAC of the second set 348 (i.e., a fourth DAC) generates drive signal "0/Q2", which is zeros interleaved with the mapped Q2 data tributary. Accordingly, the interleaving order of drive signals from the second set of DACs for the second I/Q modulator is opposite to that from the first set of DACs for the first I/Q modulator, as explained further below with respect to FIG. 4.

In this manner, each set of two DACs performs RZ shaping for a respective I/Q modulator, generating a corresponding one component (e.g., x-polarization or y-polarization) to be used for an IRZ-PDM signal. The output of an I/Q modulator may be provided to optional optical amplifier (not shown) which amplifies the modulated signal to compensate for loss during the modulation process.

The output of the I/Q modulators (i.e., x-polarization or y-polarization), with of without optional post-amplification, is provided to a PBC 350. The PBC combines the first and second polarization components to produce the resultant modulated IRZ-PDM signal. In the illustrated embodiment of FIG. 3, the signal is of QPSK modulation at a symbol rate of 28 GHz in order to achieve a data rate of 112 Gb/s for the IRZ-PDM-QPSK output by the transmitter. The transmitter 300 achieves generation of an IRZ-PDM modulated signal without the use of a pulse carver. As opposed to conventional implementations, the pulse carving function is achieved in the digital domain by using DACs sampled at twice the modulation symbol rate and by interleaving data with zeros according to the interleaving orders described above.

Figure 4:
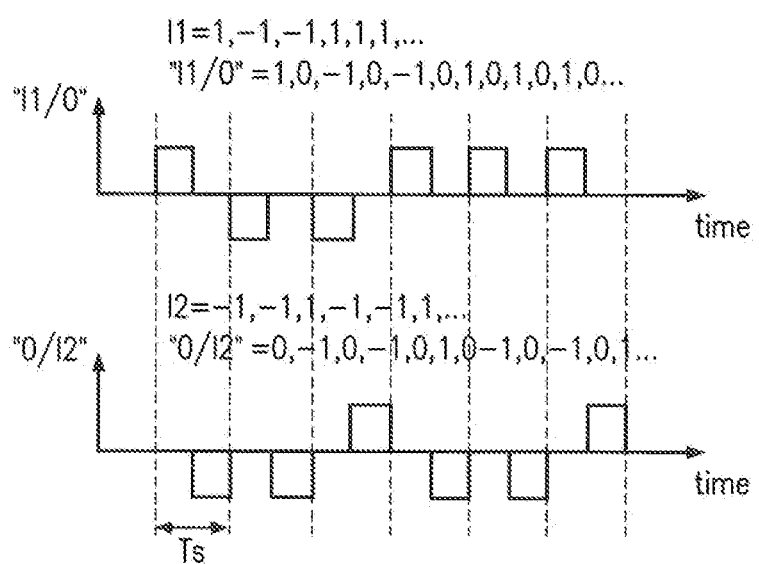
FIG. 4 is an illustration of example "opposite-order-interleaved" drive signals for the two DACs that are connected to different I/Q modulators in an example embodiment of an IRZ-PDM-QPSK transmitter.

FIG. 4 is an illustration of example opposite-order-interleaved drive signals for two DACs that are connected to different I/Q modulators in an example embodiment of an IRZ-PDM-QPSK transmitter. Drive signal "I1/0" is obtained by interleaving the mapped I1 data tributary and zeros. Drive signal "0/I2" is obtained by interleaving zeros and the mapped I2 data tributary. The mapped data tributaries may represent a 1-bit with a 1 and 0-bit with −1. Note that the modulators may be biased null (or extinction) so drive signals 1, 0, and −1 respectively lead to normalized optical fields of 1, 0, and −1 after modulation. One drive symbol occupies each symbol period, Ts.

Drive signals "Q1/0" and "0/Q2" follow similar mapping and interleaving rules as "I1/0" and "0/I2", respectively. IRZ pulse shaping is realized by the use of the DACs with these specially arranged drive patterns.

The use of DACs in embodiments according to the invention also allow the transmitter to be reconfigured to support more complex formats, such as 16-QAM, in order to offer higher data rate and/or higher spectral efficiency. In addition, embodiments according to the invention permit upgrade of certain non-return-to-zero (NRZ) PDM-QPSK transponders to IRZ-PDM-QPSK without any optical hardware change, thereby enabling higher nonlinear transmission performance and/or longer transmission distance, and potentially leading to lowered transmission system cost. As noted above, the provided embodiments for generating an Interleaved Return To Zero (IRZ) Polarization Division Multiplexed (PDM) signal do not require use of any optical pulse carver, which leads to lesser loss, cost, size, and power for such a transmitter.

Note that the sampling speed of the DACs can be more than twice the modulation symbol rate in order to perform additional pulse-shaping function. The interleaving between the data and zeros may be done with a duty cycle of 50% or less.

Note also that each intended drive pattern can have more than two values in order to support multi-level modulation formats such as QAM. For 16-QAM, each symbol in the intended drive pattern can have 4 possible values, scaling as −3, −1, 1, 3.

While this invention has been described with reference to illustrative embodiments, this description is not intended to be construed in a limiting sense.

Embodiments of present invention may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the following method claims, if any, recite steps in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor/s to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", "controllers" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "module" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method comprising:
    conversion, by a first two digital-to-analog convertors (DACs), of a first pair of drive patterns at a rate of 2/Ts to output a first two analog drive signals, each of the first two analog drive signals having a non-zero value in a first half of the symbol period and value of about zero in a second half of the symbol period;
    performing Return To Zero (RZ) shaping of a first optical carrier by a first modulator whose output corresponds to a first polarization component using the first two analog drive signals;
    conversion, by a second two DACs, of a second pair of drive patterns at the rate of 2/Ts to output a second two analog drive signals, each of the second two analog drive signals having a value of about zero in the first half of the symbol period and a non-zero value in the second half of the symbol period;
    performing RZ shaping of a second optical carrier by a second modulator whose output corresponds to a second polarization component using the second two analog drive signals.

2. The method of claim 1 further comprising:
    combining the first polarization and the second polarization components, thereby forming an Interleaved Return To Zero (IRZ) Polarization Division Multiplexed (PDM) signal.

3. The method of claim 1 wherein each of the first pair of drive patterns has a value of one for a one-bit and a value of negative one for a zero-bit.

4. The method of claim 1 wherein each of the first pair of drive patterns has more than two values.

5. The method of claim 1 further comprising
    amplifying the output of at least one the DACs prior to driving the first modulator.

6. The method of claim 1 wherein the first modulator performs at least one of quadrature phase shift keying (QPSK) modulation, quadrature amplitude modulation (QAM), and binary phase-shift keying (BPSK) modulation.

7. The method of claim 1 wherein the modulation symbol rate is approximately 28 GHz.

8. The method of claim 1 wherein the first modulator is biased at null.

9. The method of claim 1 wherein a modulation format of the first modulator is reconfigurable.

10. The method of claim 1 further comprising:
    splitting a beam from a light source into the first optical carrier and the second optical carrier;
    providing the first optical carrier to the first modulator; and
    providing the second optical carrier to the second modulator.

11. An apparatus comprising:
    a first two digital-to-analog convertors (DACs), configured to convert a first pair of drive patterns at a rate of 2/Ts to output a first two analog drive signals, each of the first analog drive signals having a non-zero value in a first half of the symbol period and value of about zero in a second half of the symbol period;
    a first modulator for performing Return To Zero (RZ) shaping of a first optical carrier by generating a first polarization component based on the output of the first two DACs;
    a second two digital-to-analog convertors (DACs), configured to convert a second pair of drive patterns at the rate of 2/Ts to output a second two analog drive signals, each of the second analog drive signals having a value of about zero in the first half of the symbol period and a non-zero value in the second half of the symbol period; and
    a second modulator for RZ shaping of a second optical carrier by generating a second polarization component based on the output of the second two DACs.

12. The apparatus of claim 11 wherein one of the first two DACs is configured to interleave an in-phase component drive pattern of the first pair of drive signal patterns and zeros, and wherein the other of the first two DACs is configured to interleave a quadrature component drive pattern of the first pair of drive signal patterns and zeros.

13. The apparatus of claim 11 further comprising:
    a polarization beam combiner for combining the first polarization and the second polarization components.

14. The apparatus of claim 11 wherein at least one of the first modulator and the second modulator is an I/Q modulator.

15. The apparatus of claim 11 further comprising:
a polarization beam splitter, wherein a first output of the polarization beam splitter is connected to the first modulator, and wherein a second output of the polarization beam splitter is connected to the second modulator.

16. The apparatus of claim 15 further comprising
a source for providing light to the polarization beam splitter.

17. The apparatus of claim 11 further comprising
an amplifier interposed between the first modulator or the second modulator and a respective at least one of the DACs.

18. The apparatus of claim 11 wherein the first modulator is configured to perform at least one of quadrature phase shift keying (QPSK) modulation, quadrature amplitude modulation (QAM), binary phase-shift keying (BPSK) modulation, and 16-QAM modulation.

19. The apparatus of claim 11 wherein the first modulator is reconfigurable to implement different modulation schemes.

20. An apparatus comprising:
a first digital-to-analog convertor (DAC) configured to convert a first data signal at a rate of 2/Ts to output a first analog drive signal having within a first half of a symbol period Ts a nonzero value and having within a second half of Ts a value about equal to zero;
a second DAC configured to convert a first data signal at a rate of 2/Ts to output a first analog drive signal having within the first half of Ts a nonzero value and having within the second half of Ts a value about equal to zero;
a first modulator for generating a first polarization component of a IRZ-PDM signal based on the first output and the second output;
a third DAC configured to convert a first data signal at a rate of 2/Ts to output a first analog drive signal having within the first half of Ts a value about equal to zero and having within the second half of Ts a nonzero value;
a fourth DAC configured to convert a first data signal at a rate of 2/Ts to output a first analog drive signal having within the first half of Ts a value about equal to zero and having within the second half of Ts a nonzero value;
a second modulator for generating a second polarization component of the IRZ-PDM signal based on the third output and the fourth output; and
a polarization beam combiner for combining the first polarization and the second polarization component,
wherein one of the first DAC and the second DAC is configured to interleave an in-phase component drive pattern of the first pair of drive signal patterns and zeros, and wherein the other of the first DAC and the second DAC is configured to interleave a quadrature component drive pattern of the first pair of drive signal patterns and zeros.

* * * * *